United States Patent
Riffe et al.

(10) Patent No.: US 10,202,937 B2
(45) Date of Patent: Feb. 12, 2019

(54) MONOLITHIC GALLERYLESS PISTON AND METHOD OF CONSTRUCTION THEREOF

(71) Applicant: Federal-Mogul LLC, Southfield, MI (US)

(72) Inventors: Jeff Riffe, Troy, MI (US); Michael Weinenger, Southfield, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 15/657,018

(22) Filed: Jul. 21, 2017

(65) Prior Publication Data

US 2017/0321628 A1 Nov. 9, 2017

Related U.S. Application Data

(62) Division of application No. 14/535,839, filed on Nov. 7, 2014, now Pat. No. 9,869,268.

(Continued)

(51) Int. Cl.
*F02F 3/16* (2006.01)
*F02F 3/00* (2006.01)
*B23P 15/10* (2006.01)

(52) U.S. Cl.
CPC .............. *F02F 3/16* (2013.01); *B23P 15/10* (2013.01); *F02F 3/00* (2013.01); *F02F 3/0069* (2013.01);
(Continued)

(58) Field of Classification Search
CPC .... F02F 3/0092; F02F 3/14; F02F 3/16; F02F 3/00; F02F 3/0069; F02F 2003/0007;
(Continued)

(56) References Cited

U.S. PATENT DOCUMENTS 4,704,950 A 11/1987 Ripberger et al.
6,772,846 B1 8/2004 Scharp
(Continued)

FOREIGN PATENT DOCUMENTS

JP S58142313 9/1983
JP S61058954 A 3/1986
(Continued)

OTHER PUBLICATIONS

International Search Report, dated Feb. 20, 2015 (PCT/US2014/064582).
(Continued)

*Primary Examiner* — Syed O Hasan
(74) *Attorney, Agent, or Firm* — Robert L. Stearns; Dickinson Wright, PLLC (57) ABSTRACT

A galleryless piston for an internal combustion engine and method of construction thereof are provided. The piston has a monolithic piston body extending along a central longitudinal axis. The piston body has an upper wall forming an upper combustion surface with first and second portions, with the first portion extending annularly along an outer periphery of the upper wall and the second portion forming a combustion bowl. The upper wall has an undercrown surface on an underside of the combustion bowl directly opposite the second portion of the upper combustion surface. The undercrown surface has an openly exposed surface area, as viewed looking along the central longitudinal axis, thereby providing an expansive area against which oil being splashed or sprayed can freely contact to cool the piston.

26 Claims, 12 Drawing Sheets

Related U.S. Application Data (60) Provisional application No. 62/011,876, filed on Jun. 13, 2014, provisional application No. 61/901,287, filed on Nov. 7, 2013.

(52) U.S. Cl.
CPC .... *F02F 3/0092* (2013.01); *F02F 2003/0007* (2013.01); *Y10T 29/49265* (2015.01)

(58) Field of Classification Search
CPC ... B23P 15/10; B23P 5/10; B05D 5/00; Y10T 29/49265
USPC ............... 123/193.4, 193.6, 193.1, 41.38; 29/888.04, 888.044, 888.049, 888.05
See application file for complete search history.

(56) References Cited

U.S. PATENT DOCUMENTS

| | | | |
|---|---|---|---|
| 6,840,156 | B1 | 1/2005 | Gillman et al. |
| 6,860,190 | B2 | 3/2005 | Oversby et al. |
| 6,938,603 | B2 * | 9/2005 | Scharp .................. F02F 3/22 123/193.1 |
| 8,434,333 | B2 | 5/2013 | Zhang et al. |
| 2002/0139322 | A1 * | 10/2002 | Murglin ................ F01M 1/08 123/41.35 |
| 2003/0221639 | A1 * | 12/2003 | Weng .................... F01P 3/08 123/41.35 |
| 2004/0261612 | A1 | 12/2004 | Gillman et al. |
| 2008/0034691 | A1 | 2/2008 | Rasmussen |
| 2008/0105118 | A1 | 5/2008 | Frank et al. |
| 2008/0216790 | A1 | 9/2008 | Breidenbach et al. |
| 2012/0234285 | A1 | 9/2012 | Venugopal et al. |
| 2013/0032120 | A1 | 2/2013 | Claver et al. |
| 2013/0118438 | A1 | 5/2013 | Lineton |
| 2013/0233270 | A1 | 9/2013 | Brandt |
| 2015/0122212 | A1 | 5/2015 | Riffe et al. |

FOREIGN PATENT DOCUMENTS

| | | |
|---|---|---|
| JP | 2007500608 A | 1/2007 |
| JP | 2007309477 A | 11/2007 |
| JP | 2010509529 A | 3/2010 |
| KR | 20090064187 | 6/2009 |
| WO | 2007135534 | 11/2007 |

OTHER PUBLICATIONS

International Search Report, dated Mar. 13, 2017 (PCT/US2017/012113).

* cited by examiner

| | PRIOR ART (INCLUDE GALLERY) | | | | | | | | |
|---|---|---|---|---|---|---|---|---|---|
| Bore Diameter (mm²) | 107 | 106.5 | 103 | 110 | 99 | 107 | 170 | 170 |
| Weld Position | In Bowl | Under Bowl | In Bowl | Under Bowl | In Bowl | In Bowl | In Bowl | Under Bowl |
| 3D Undercrown Surface Area (mm²) | 1858.21 | 2112.99 | 1404.06 | 1939.62 | 1645.86 | 1555.91 | 6109.00 | 5306.90 |
| 2D Projected Surface Area (mm²) | 1465.36 | 1797.51 | 1193.57 | 1378.50 | 1393.16 | 1431.16 | 4538.53 | 3640.42 |
| 3D Pocket Surface Area (mm²) | - | - | - | - | - | - | - | - |
| Maximum Bowl Diameter (mm) | 73.2 | 79.79 | 65.1 | 101.38 | 72.39 | 63.6 | 123.66 | 114 |
| Maximum Undercrown Diameter (mm) | 52.39 | 47.84 | 57.63 | 41.89 | 57.78 | 59.91 | 84.2 | 70.78 |
| Spacing of Pinbosses at Pin Bore CL (mm) | 76.4 | 70 | 70.7 | 76.9 | 70.7 | 76.4 | 138.5 | 124.5 |
| Pin Length (mm) | 67.5 | 62.5 | 63 | 68 | 62 | 67.5 | 126 | 112 |
| 3D Undercrown Surface Area vs. Bore Area | 20.67% | 23.72% | 16.85% | 20.41% | 21.38% | 17.30% | 26.91% | 23.38% |
| 2D Projected Surface Area vs. Bore Area | 16.30% | 20.18% | 14.32% | 14.51% | 18.10% | 15.92% | 20.00% | 16.04% |
| Pocket Surface Area vs. Bore Area | - | - | - | - | - | - | - | - |
| Maximum Undercrown Diameter vs. Bore Diameter | 48.96% | 44.92% | 55.95% | 38.08% | 58.36% | 55.99% | 49.53% | 41.64% |
| Maximum Undercrown Diameter vs. Maximum Bowl Diameter | 71.57% | 59.96% | 88.53% | 41.32% | 79.82% | 94.20% | 68.09% | 62.09% |
| Spacing of Pinbosses at Pin Bore CL vs. Bore Diameter | 71.40% | 65.73% | 68.64% | 69.91% | 71.41% | 71.40% | 81.47% | 73.24% |
| Pin Length vs. Bore Diameter | 63.08% | 58.69% | 61.17% | 61.82% | 62.63% | 63.08% | 74.12% | 65.88% |

FIG. 19A

| | PRIOR ART (INCLUDE GALLERY) | | | | |
|---|---|---|---|---|---|
| | 150 | 132 | 130 | 82 | 94 |
| Bore Diameter (mm²) | Under Bowl | Under Bowl | In Bowl | In Bowl | In Bowl |
| Weld Position | | | | | |
| 3D Undercrown Surface Area (mm²) | 4805.46 | 2827.89 | 2360.84 | 1175.57 | 1223.58 |
| 2D Projected Surface Area (mm²) | 3937.05 | 2509.73 | 1790.30 | 1009.06 | 871.81 |
| 3D Pocket Surface Area (mm²) | - | - | - | - | - |
| Maximum Bowl Diameter (mm) | 114 | 104 | 92 | 60.16 | 58.2 |
| Maximum Undercrown Diameter (mm) | 67.68 | 56.53 | 62.42 | 51.39 | 48.77 |
| Spacing of Pinbosses at Pin Bore CL (mm) | 125.5 | 98.7 | 91 | 58 | 59.6 |
| Pin Length (mm) | 112.2 | 88.3 | 80 | 50 | 51 |
| 3D Undercrown Surface Area vs. Bore Area | 27.19% | 20.66% | 17.79% | 22.26% | 17.63% |
| 2D Projected Surface Area vs. Bore Area | 22.28% | 18.34% | 13.49% | 19.11% | 12.56% |
| Pocket Surface Area vs. Bore Area | - | - | - | - | - |
| Maximum Undercrown Diameter vs. Bore Diameter | 45.12% | 42.83% | 48.02% | 62.67% | 51.88% |
| Maximum Undercrown Diameter vs. Maximum Bowl Diameter | 59.37% | 54.36% | 67.85% | 85.42% | 83.80% |
| Spacing of Pinbosses at Pin Bore CL vs. Bore Diameter | 83.67% | 74.77% | 70.00% | 70.73% | 63.40% |
| Pin Length vs. Bore Diameter | 74.80% | 66.89% | 61.54% | 60.98% | 54.26% |

FIG. 19B

|  | | Galleryless | | | | |
| --- | --- | --- | --- | --- | --- | --- |
|  | 10 | 10' | 10'' | 10''' | 10'''' |
| Bore Diameter (mm²) | 107 | 106.5 | 103 | 110 | 99 |
| Weld Position | - | - | - | - | - |
| 3D Undercrown Surface Area (mm²) | 6772.59 | 4612.80 | 7060.36 | 3978.20 | 5631.11 |
| 2D Projected Surface Area (mm²) | 3874.64 | 3620.62 | 3813.75 | 3619.12 | 3436.16 |
| 3D Pocket Surface Area (mm²) | 6693.28 | 4777.01 | 5400.23 | 5391.99 | 3757.04 |
| Maximum Bowl Diameter (mm) | 73.2 | 79.79 | 65.1 | 100 | 72.39 |
| Maximum Undercrown Diameter (mm) | 87.79 | 88.12 | 86.3 | 89.14 | 83.41 |
| Spacing of Pinbosses at Pin Bore CL (mm) | 62.3 | 64.15 | 60 | 64.60 | 65.24 |
| Pin Length (mm) | 53 | 56.5 | 52.25 | 57 | 57 |
| 3D Undercrown Surface Area vs. Bore Area | 75.32% | 51.78% | 84.73% | 41.86% | 73.15% |
| 2D Projected Surface Area vs. Bore Area | 43.09% | 40.64% | 45.77% | 38.08% | 44.64% |
| Pocket Surface Area vs. Bore Area | 74.44% | 53.62% | 64.81% | 56.74% | 48.81% |
| Maximum Undercrown Diameter vs. Bore Diameter | 82.05% | 82.74% | 83.79% | 81.04% | 84.25% |
| Maximum Undercrown Diameter vs. Maximum Bowl Diameter | 119.93% | 110.44% | 132.57% | 89.14% | 115.22% |
| Spacing of Pinbosses at Pin Bore CL vs. Bore Diameter | 58.22% | 60.23% | 58.25% | 58.73% | 65.90% |
| Pin Length vs. Bore Diameter | 49.53% | 53.05% | 50.73% | 51.82% | 57.58% |

FIG. 19C

MONOLITHIC GALLERYLESS PISTON AND METHOD OF CONSTRUCTION THEREOF

CROSS-REFERENCE TO RELATED APPLICATION

This divisional application claims priority to U.S. application Ser. No. 14/535,839, filed Nov. 7, 2014, which claims the benefit of U.S. Provisional Application Ser. No. 62/011,876, filed Jun. 13, 2014, and the benefit of U.S. Provisional Application Ser. No. 61/901,287, filed Nov. 7, 2013, all of which are incorporated herein, by reference, in their entirety.

BACKGROUND OF THE INVENTION

1. Technical Field

This invention relates generally to internal combustion engines, and more particularly to pistons therefor.

2. Related Art

Engine manufacturers are encountering increasing demands to improve engine efficiencies and performance, including, but not limited to, improving fuel economy, reducing oil consumption, improving fuel systems, increasing compression loads and operating temperature within the cylinder bores, reducing heat loss through the piston, improving lubrication of component parts, decreasing engine weight and making engines more compact, while at the same time decreasing the costs associated with manufacture. While desirable to increase the compression load and operation temperature within the combustion chamber, it remains necessary to maintain the temperature of the piston within workable limits. Accordingly, although desirable to increase the compression load and operation temperature within the combustion chamber, achieving this goal comes with a tradeoff in that these desirable "increases" limit the degree to which the piston compression height, and thus, overall piston size and mass can be decreased. This is particularly troublesome with typical piston constructions having a closed or partially closed cooling gallery considered necessary to reduce the operating temperature of the piston. Further, the cost to manufacture pistons having upper and lower parts joined together along a bond joint to form the closed or partially closed cooling gallery is generally increased due to the joining process used to bond the upper and lower parts together. Further, the degree to which the engine weight can be reduced is impacted by the need to make the aforementioned "cooling gallery-containing" pistons from steel so they can withstand the increase in mechanical and thermal loads imposed on the piston.

A piston constructed in accordance with this invention overcomes the aforementioned disadvantages of known piston constructions and other disadvantages, as will become apparent to those skilled in the art upon reading the disclosure and viewing the drawings herein.

SUMMARY OF THE INVENTION

A piston constructed in accordance with this invention is constructed of a monolithic piece of steel, thereby providing the piston with enhanced strength and durability to withstand increased compression loads and temperatures within a cylinder bore, such as those loads and temperatures seen in modern high performance engines. Further, due to the novel single piece configuration of the piston, the costs associated with the manufacture of the piston are reduced in that the typical processes used to join piston upper and lower parts together are not employed. Further, in a piston constructed in accordance with the invention, the compression height (CH) and weight of the piston are able to be significantly reduced relative to a piston including a closed or partially closed cooling gallery, particularly since the piston does away with the presence of a floor commonly used to form a cooling gallery, thereby allowing an engine in which the pistons are deployed to be made more compact, lightweight and fuel efficient.

In accordance with one aspect of the invention, a first galleryless piston for an internal combustion engine is provided. The piston has a monolithic piston body extending along a central longitudinal axis along which the piston reciprocates in a cylinder bore of an internal combustion engine. The piston body has an upper wall forming an upper combustion surface with an annular ring belt region depending from the upper combustion surface for receipt of at least one piston ring. The piston body further includes a pair of skirt portions depending from the ring belt region to facilitate guiding the piston within a cylinder bore, and a pair of pin bosses providing a pair of laterally spaced pin bores aligned along a pin bore axis for receipt of a wrist pin. The upper combustion surface has first and second portions, with the first portion extending annularly along an outer periphery of the upper wall and the second portion forming a combustion bowl depending radially inwardly from the first portion. The upper wall has an undercrown surface formed on an underside of the combustion bowl directly opposite the second portion of the upper combustion surface. The undercrown surface has a total 3-dimensional surface area that is greater than 40 percent of an area defined by a maximum outer diameter of the piston body.

In accordance with another aspect of the invention, the undercrown surface can have a total 3-dimensional surface area greater than 50 percent of the area of the piston body.

In accordance with another aspect of the invention, the undercrown surface can have a total 3-dimensional surface area greater than 60 percent of the area of the piston body.

In accordance with another aspect of the invention, the undercrown surface can have a total 3-dimensional surface area greater than 70 percent of the area of the piston body.

In accordance with another aspect of the invention, the undercrown surface can have a diameter between about 75-90 percent of the maximum outer diameter of the piston body.

In accordance with another aspect of the invention, the combustion has a maximum combustion bowl diameter and the undercrown surface can have a diameter that is at least 85 percent of the maximum combustion bowl diameter.

In accordance with another aspect of the invention, the undercrown surface can have a diameter that is between 100-140 percent of the maximum combustion bowl diameter.

In accordance with another aspect of the invention, a pair of pockets can extend radially outwardly from the pin bosses along the pin bore axis to the ring belt region, with the pockets defining at least a portion of the undercrown surface and a portion of an underside of the first portion and a portion of an inner surface of the annular ring belt region, with the pockets having a total 3-dimensional surface area between about 45-85 percent of the area of the piston body.

In accordance with another aspect of the invention, the pockets can have a total 3-dimensional surface area greater than 60 percent of the area of the piston body.

In accordance with another aspect of the invention, the pockets can have a total 3-dimensional surface area greater than 70 percent of the area of the piston body.

In accordance with another aspect of the invention, the pin bosses can have radially outermost surfaces spaced from one another along the pin bore axis at a first distance that is less than 60 percent of the maximum outer diameter of the piston body.

In accordance with another aspect of the invention, a second galleryless piston for an internal combustion engine is provided. The piston has a monolithic piston body extending along a central longitudinal axis along which the piston reciprocates in a cylinder bore of an internal combustion engine. The piston body has an upper wall forming an upper combustion surface with an annular ring belt region depending from the upper combustion surface for receipt of at least one piston ring. A pair of skirt portions depends from the ring belt region to facilitate guiding the piston within a cylinder bore and a pair of pin bosses provides a pair of laterally spaced pin bores aligned along a pin bore axis for receipt of a wrist pin. The upper combustion surface has first and second portions. The first portion extends annularly along an outer periphery of the upper wall and the second portion forms a combustion bowl depending radially inwardly from the first portion. The upper wall has an undercrown surface formed on an underside of the combustion bowl directly opposite the second portion of the upper combustion surface, wherein the combustion bowl has a maximum combustion bowl diameter and the undercrown surface has a diameter that is at least 85 percent of the maximum combustion bowl diameter.

In accordance with another aspect of the invention, the undercrown surface of the second galleryless piston can have a diameter that is between 100-140 percent of the maximum combustion bowl diameter.

In accordance with another aspect of the invention, a pair of pockets of the second galleryless piston can extend radially outwardly from the pin bosses along the pin bore axis to the ring belt region, with the pockets defining at least a portion of the undercrown surface and a portion of an underside of the first portion and a portion of an inner surface of the annular ring belt region, wherein the pockets can have a total 3-dimensional surface area between about 45-85 percent of the area of the piston body.

In accordance with another aspect of the invention, the pockets of the second galleryless piston can have a total 3-dimensional surface area greater than 60 percent of the area of the piston body.

In accordance with another aspect of the invention, the pockets of the second galleryless piston can have a total 3-dimensional surface area greater than 70 percent of the area of the piston body.

In accordance with another aspect of the invention, the piston body of the second galleryless piston has a maximum outer diameter and the pin bosses can have radially outermost surfaces spaced from one another along the pin bore axis at a first distance that is less than 60 percent of the maximum outer diameter of the piston body.

In accordance with another aspect of the invention, a third galleryless piston for an internal combustion engine is provided. The piston has a monolithic piston body extending along a central longitudinal axis along which the piston reciprocates in a cylinder bore of an internal combustion engine. The piston body has an upper wall forming an upper combustion surface with an annular ring belt region depending from the upper combustion surface for receipt of at least one piston ring. A pair of skirt portions depends from the ring belt region to facilitate guiding the piston within a cylinder bore. A pair of pin bosses provides a pair of laterally spaced pin bores aligned along a pin bore axis for receipt of a wrist pin. The upper combustion surface has first and second portions. The first portion extends annularly along an outer periphery of the upper wall and the second portion forms a combustion bowl depending radially inwardly from the first portion. The upper wall has an undercrown surface formed on an underside of the combustion bowl directly opposite the second portion of the upper combustion surface, wherein a pair of pockets extends radially outwardly from the pin bosses along the pin bore axis to the ring belt region. The pockets define at least a portion of the undercrown surface and a portion of an underside of the first portion and a portion of an inner surface of the annular ring belt region. The pockets have a total 3-dimensional surface area between 45-85 percent of an area defined by a maximum outer diameter of the piston body.

In accordance with another aspect of the invention, the pockets can have a total 3-dimensional surface area greater than 60 percent of the area of the piston body.

In accordance with another aspect of the invention, the pockets of the third galleryless piston can have a total 3-dimensional surface area greater than 70 percent of said area of said piston body.

In accordance with another aspect of the invention, the undercrown surface of the third galleryless piston can have a total 3-dimensional surface area greater than 50 percent of the area of the piston body.

In accordance with another aspect of the invention, the undercrown surface of the third galleryless piston can have a total 3-dimensional surface area greater than 60 percent of the area of the piston body.

In accordance with another aspect of the invention, the undercrown surface of the third galleryless piston can have a total 3-dimensional surface area greater than 70 percent of the area of the piston body.

In accordance with another aspect of the invention, the undercrown surface of the third galleryless piston can have a diameter between about 75-90 percent of the maximum outer diameter of the piston body.

In accordance with another aspect of the invention, the combustion bowl of the third galleryless piston has a maximum combustion bowl diameter and the undercrown surface can have a diameter that is at least 85 percent of the maximum combustion bowl diameter.

In accordance with another aspect of the invention, the undercrown surface of the third galleryless piston can have a diameter that is between 100-140 percent of the maximum combustion bowl diameter.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Referring in more detail to the drawings, FIGS. 1-4 illustrate views of a piston 10 constructed in accordance with one presently preferred embodiment of the invention for reciprocating movement in a cylinder bore or chamber (not shown) of an internal combustion engine, such as a modern, compact, high performance vehicle engine, for example. The piston 10 is constructed having a monolithic body 12 formed from a single piece of material, such as via machining, forging or casting, with possible finish machining performed thereafter, if desired, to complete construction. Accordingly, the piston 10 does not have a plurality of parts joined together, such as upper and lower parts joined to one another, which is commonplace with pistons having enclosed or partially enclosed cooling galleries bounded or partially bounded by a cooling gallery floor. To the contrary, the piston 10 is "galleryless" in that it does not have a cooling gallery floor or other features bounding or partially bounding a cooling gallery. The piston body 12, being made of steel, is strong and durable to meet the high performance demands, i.e. increased temperature and compression loads, of modern day high performance internal combustion engines. The steel (i.e., the steel alloy) used to construct the body can be SAE 4140 grade or different, depending on the requirements of the piston 10 in the particular engine application. Due to the piston 10 being galleryless, the novel configuration of the body 12, among other things discussed below, minimizes the weight and compression height (CH) of the piston 10, thereby allowing an engine in which the pistons 10 are deployed to achieve a reduced weight and to be made more compact. Further yet, even though being galleryless, the novel construction discussed below and shown in the figures allows the piston 10 to be sufficiently cooled during use to withstand the most severe operating temperatures.

Figure 1:
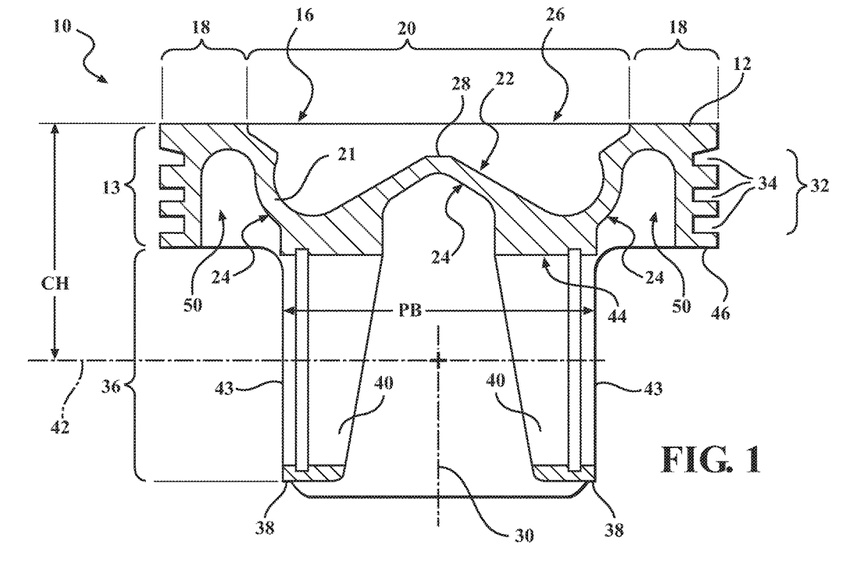
FIG. 1 is a cross-sectional view taken generally along a pin bore axis of a piston constructed in accordance with one aspect of the invention.
Figure 2:
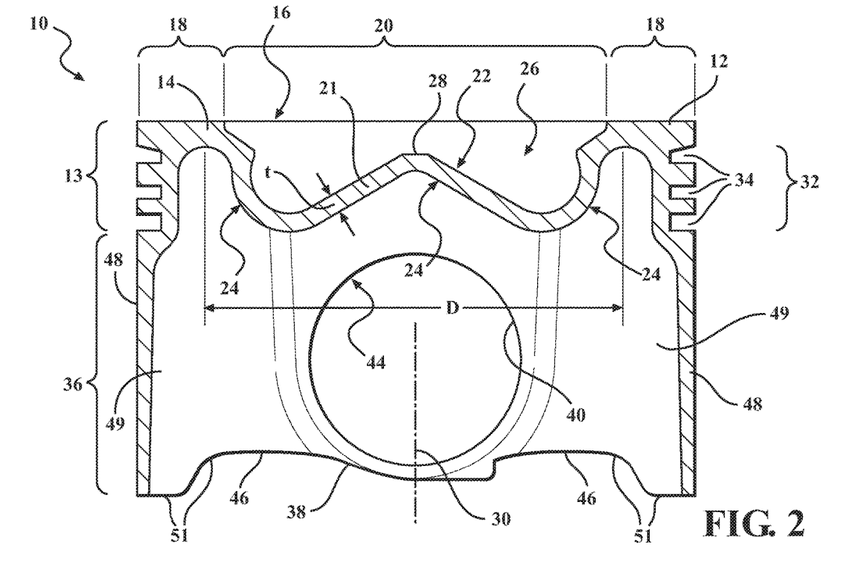
FIG. 2 is a cross-sectional view taken generally transversely to the pin bore axis of the piston of FIG. 1.
Figure 3:
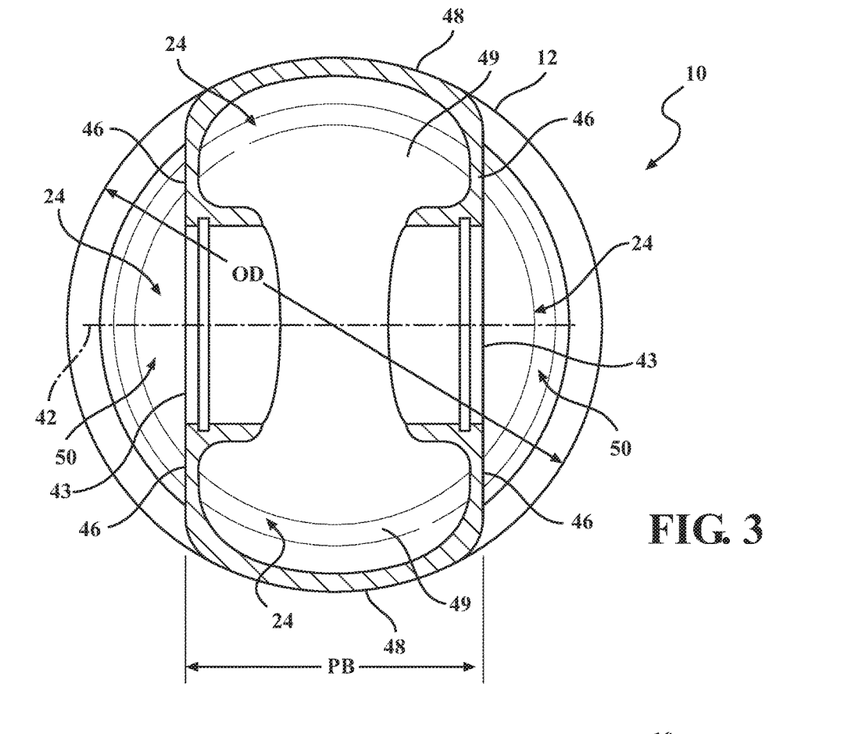
FIG. 3 is a bottom cross-sectional view taken generally along a central pin bore axis of the piston of the piston of FIG. 1.
Figure 4:
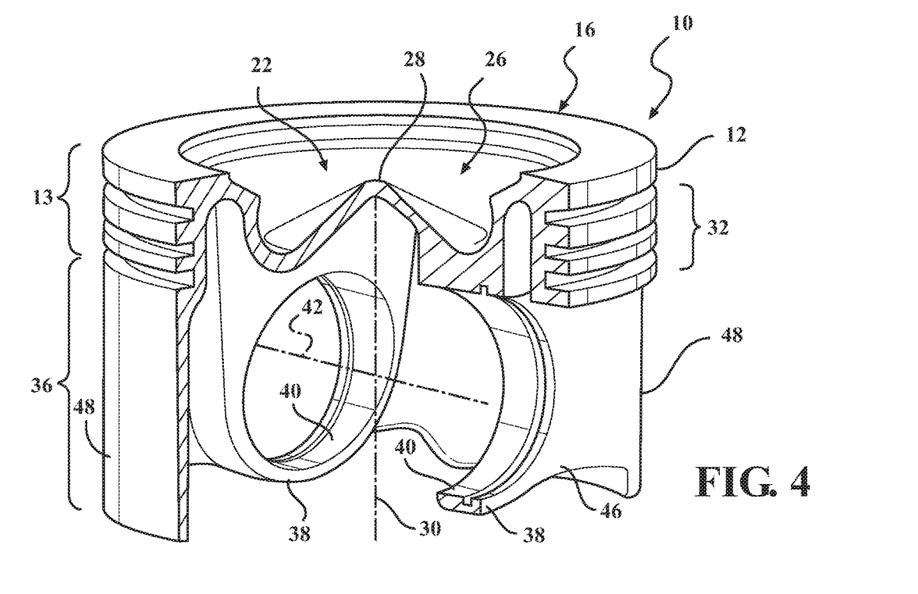
FIG. 4 is a partially sectioned perspective view of the piston of FIG. 1.
Figure 5:
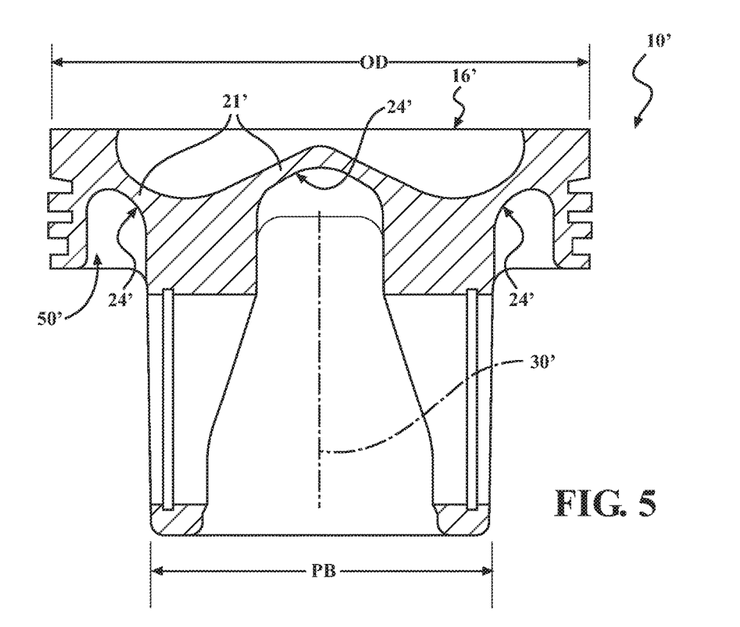
FIG. 5 is a cross-sectional view taken generally along a pin bore axis of a piston constructed in accordance with another embodiment of the invention.
Figure 6:
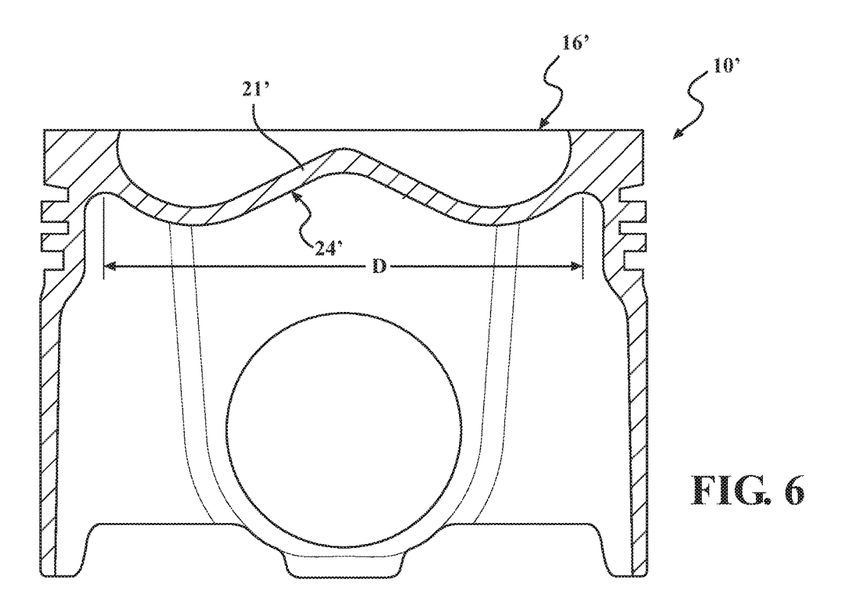
FIG. 6 is a cross-sectional view taken generally transversely to the pin bore axis of the piston of FIG. 5.
Figure 7:
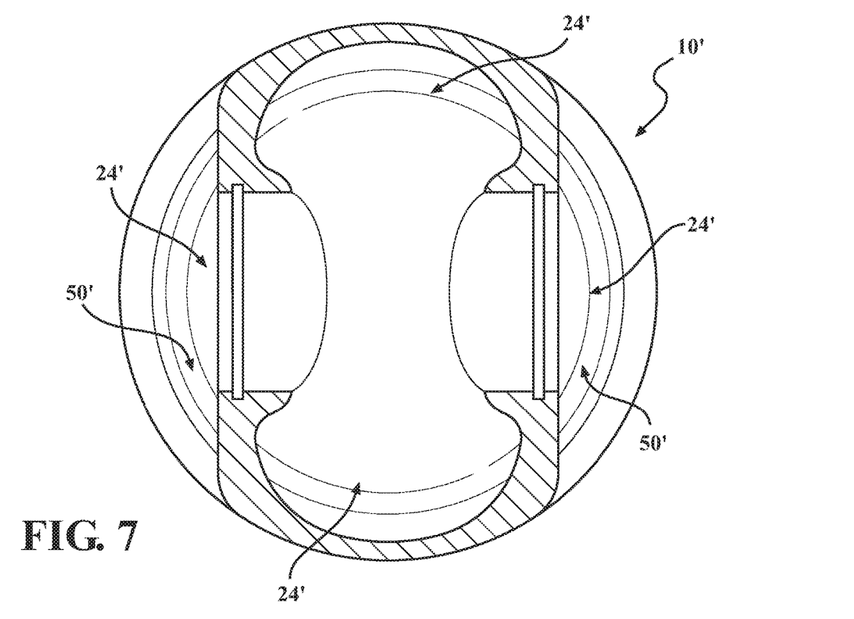
FIG. 7 is a bottom cross-sectional view taken generally along a central pin bore axis of the piston of the piston of FIG. 5.
Figure 8:
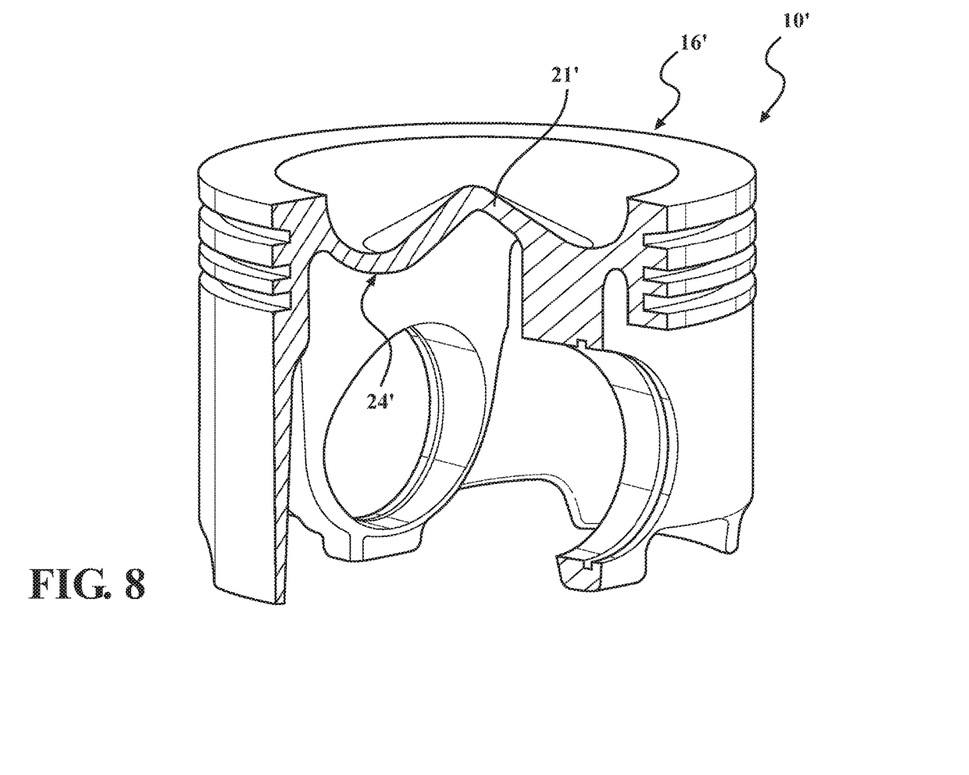
FIG. 8 is a partially sectioned perspective view of the piston of FIG. 5.
Figure 9:
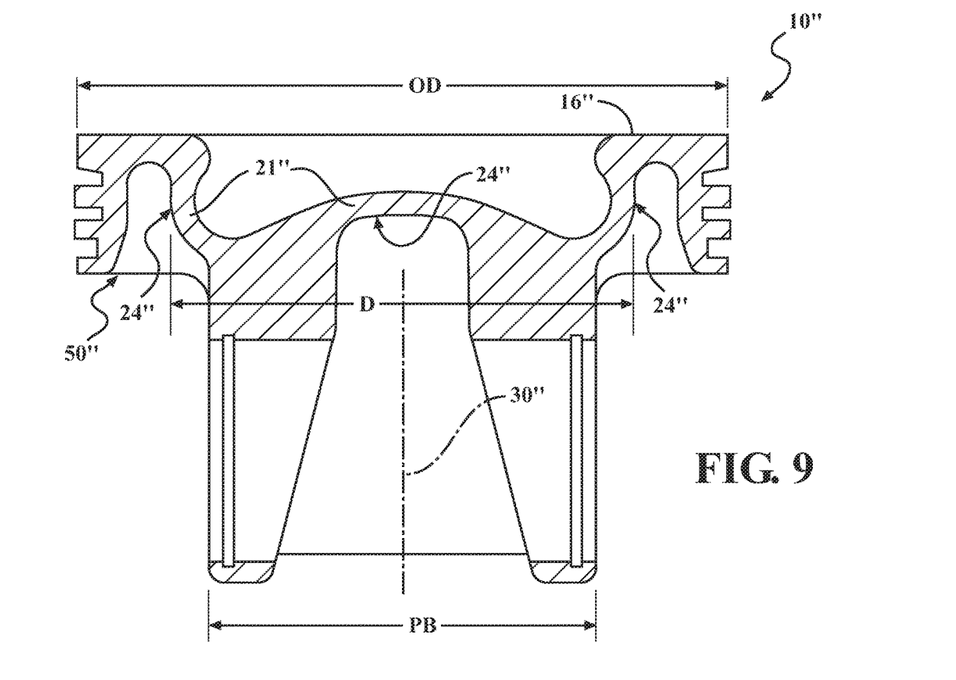
FIG. 9 is a cross-sectional view taken generally along a pin bore axis of a piston constructed in accordance with yet another embodiment of the invention.
Figure 10:
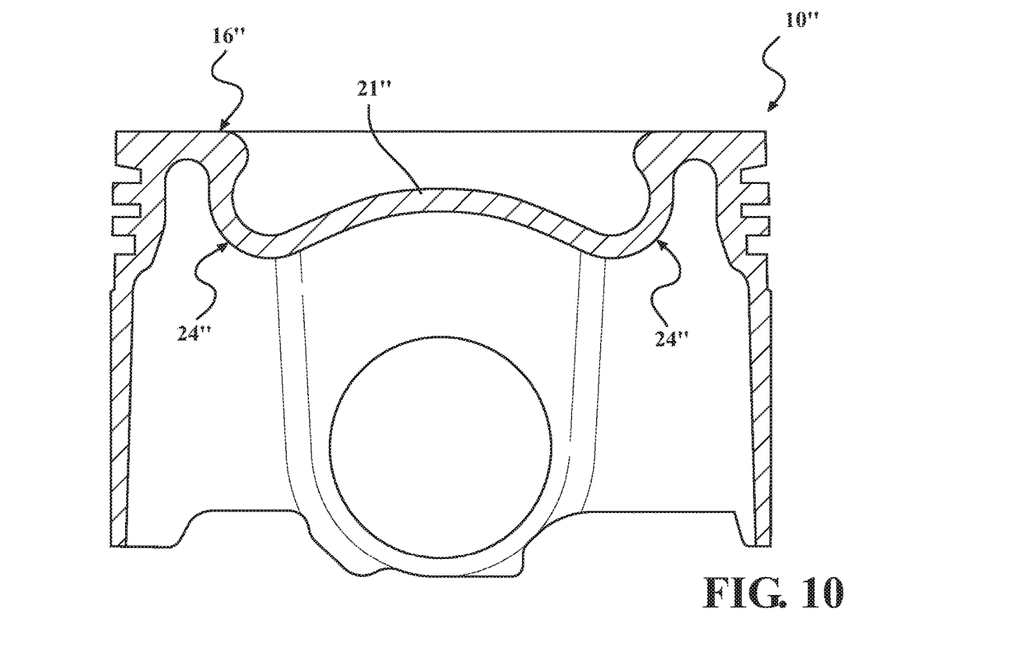
FIG. 10 is a cross-sectional view taken generally transversely to the pin bore axis of the piston of FIG. 9.
Figure 11:
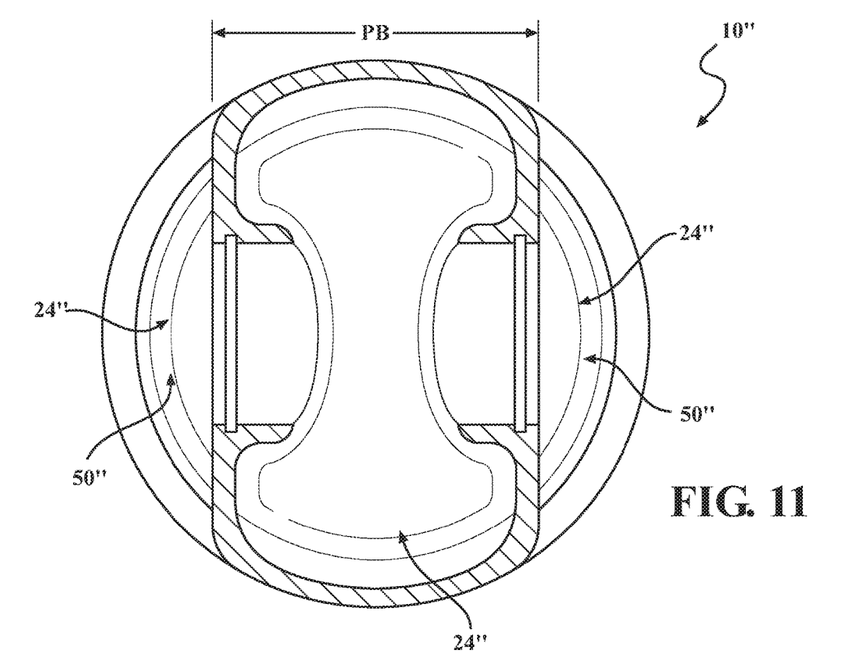
FIG. 11 is a bottom cross-sectional view taken generally along a central pin bore axis of the piston of the piston of FIG. 9.
Figure 12:
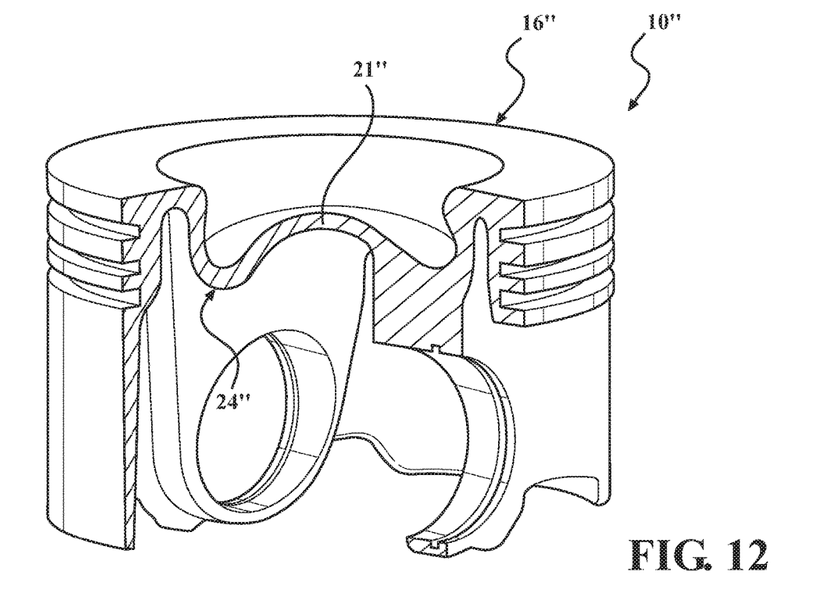
FIG. 12 is a partially sectioned perspective view of the piston of FIG. 9.
Figure 13:
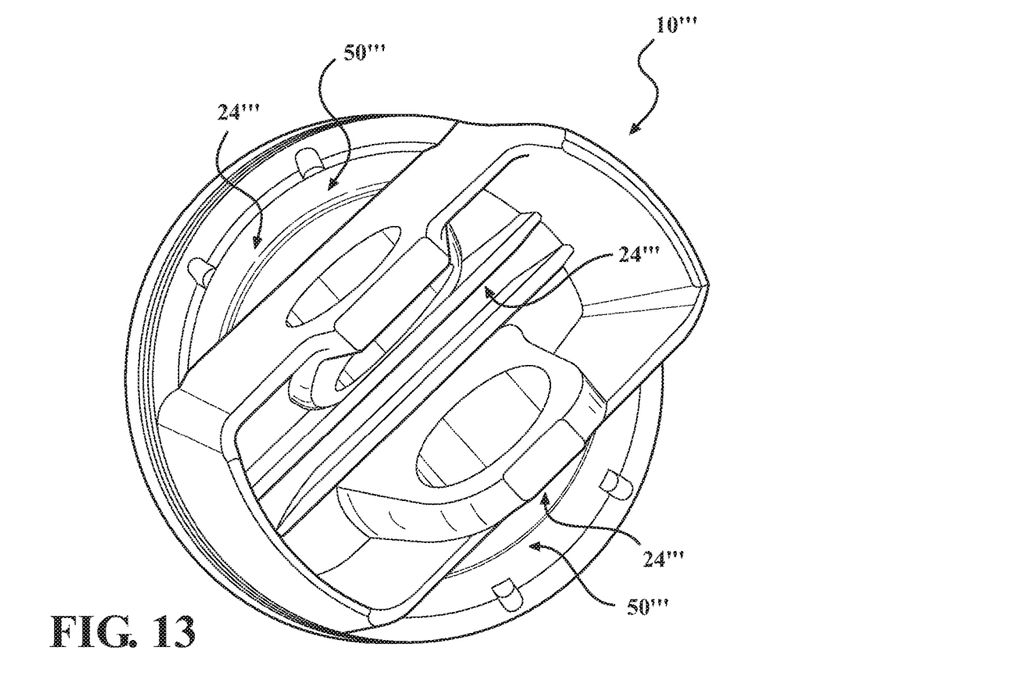
FIG. 13 is a perspective view of a piston constructed in accordance with yet another embodiment of the invention.
Figure 14:
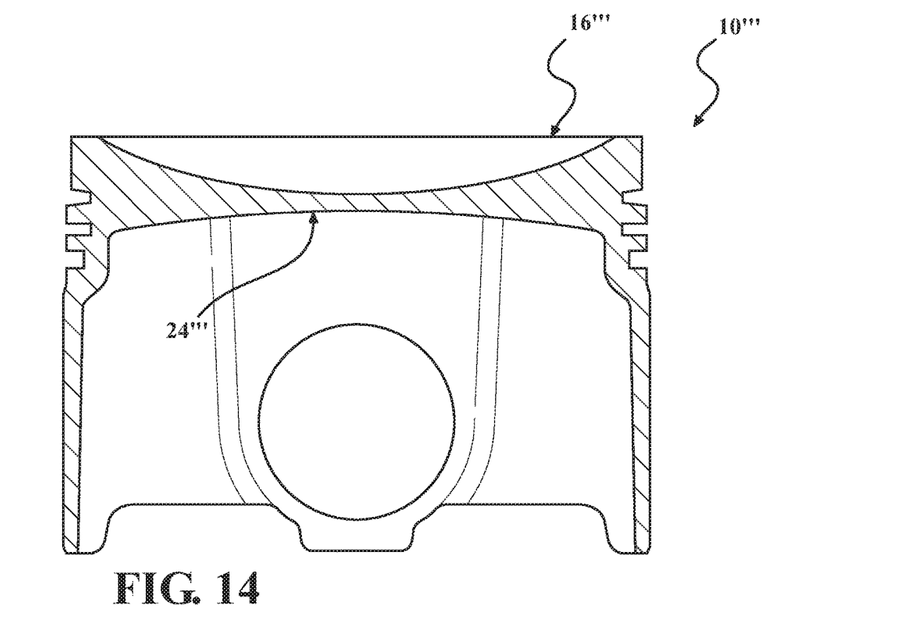
FIG. 14 is a cross-sectional view taken generally transversely to a pin bore axis of the piston of FIG. 13.
Figure 15:
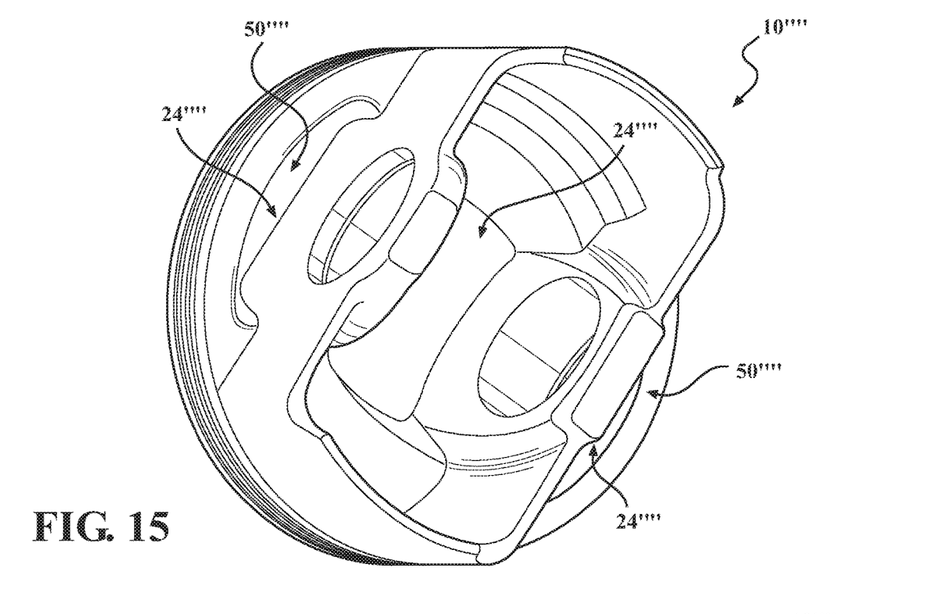
FIG. 15 is a perspective view of a piston constructed in accordance with yet another embodiment of the invention.
Figure 16:
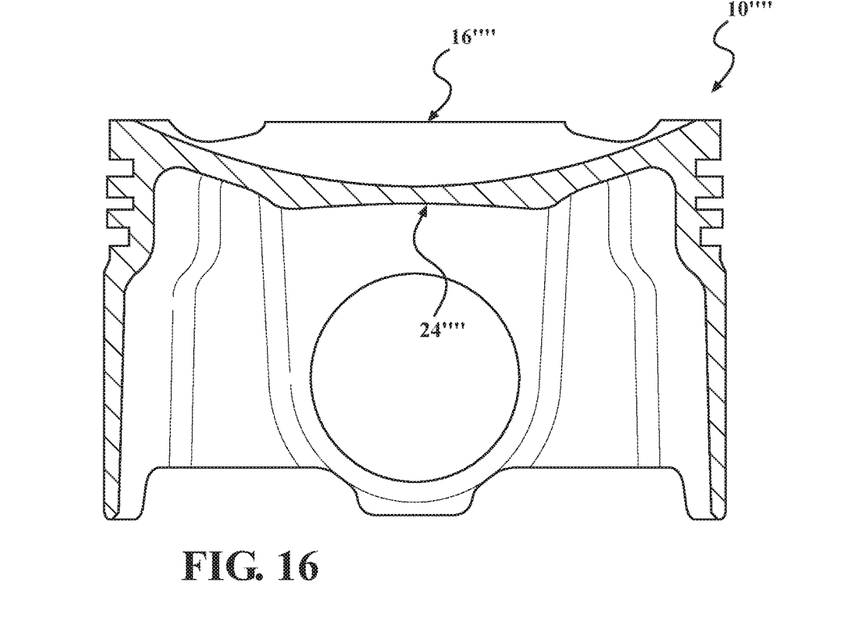
FIG. 16 is a cross-sectional view taken generally transversely to a pin bore axis of the piston of FIG. 15.
Figure 17:
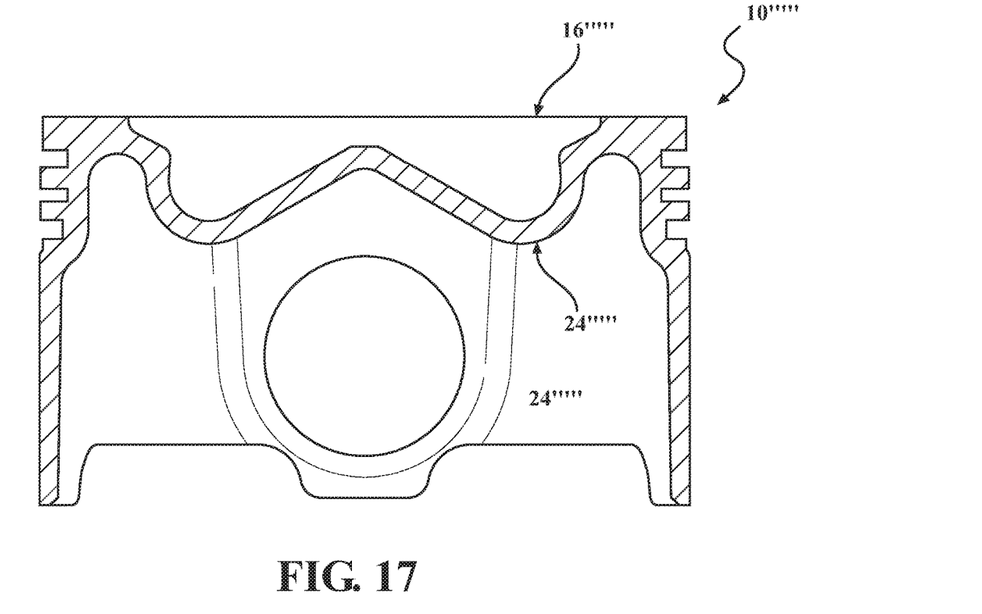
FIG. 17 is a cross-sectional view taken generally transversely to a central pin bore axis of a piston constructed in accordance with yet another embodiment of the invention.
Figure 18:
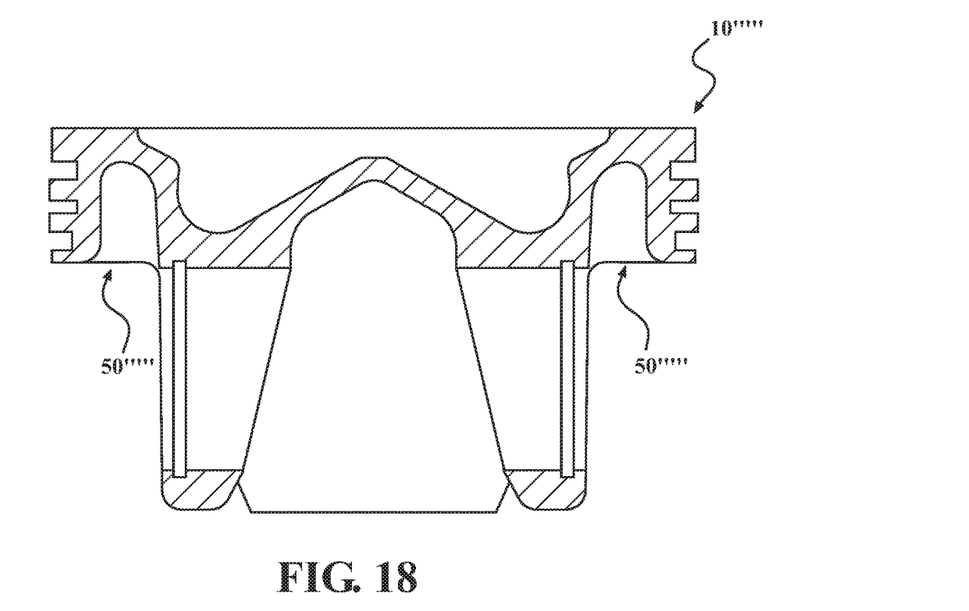
FIG. 18 is a cross-sectional view of the piston of FIG. 17 taken generally along the central pin bore axis of the piston.

The piston body 12 has an upper head or top section 13 providing a top wall, also referred to as upper wall 14, which provides an upper combustion surface 16 that is directly exposed to combustion gasses within the cylinder bore of the internal combustion engine. The upper combustion surface 16 includes an annular first portion 18 formed as a substantially planar surface extending along an outer periphery of the upper wall 14 and a second portion 20 defined by a combustion bowl wall portion 21 of the upper wall 14. The second portion 20 has a non-planar, undulating surface 22 that depends from the planar first portion 18 and extends along an uppermost surface of the combustion bowl wall portion 21. An undercrown surface 24 is formed on an underside of the combustion bowl wall portion 21 directly opposite the second portion 20 of the upper combustion surface 16. The undercrown 24 is defined here to be the surface that is visible, excluding the pin bores 40, when observing the piston straight on from the bottom, wherein the undercrown surface 24 extends to a distance no more than 2 times the minimum thickness (t) of the combustion bowl wall portion 21 away from the second portion 20 of the upper combustion surface 16. Accordingly, the undercrown surface 24 is generally form fitting to the second portion 20 of the combustion bowl 26 to provide a minimum distance to the combustion bowl 26 and is substantially the surface on the opposite side from the undulating surface 22 of the combustion bowl wall portion 21. The undercrown surface 24, 24', 24", 24'", 24"", 24""' is openly exposed as viewed from an underside of the piston 10 (FIGS. 1-4), 10' FIGS. 5-8), 10" (FIGS. 9-12), 10'" (FIGS. 13-14); 10"" (FIGS. 15-16), 10""' (FIGS. 17-18), and it is not bounded by an enclosed or partially enclosed cooling gallery, or any other features tending to retain oil or a cooling fluid near the undercrown surface 24, 24', 24", 24'", 24"", 24""'.

The annular first portion 18 of the upper wall 14 forms an outer periphery of the upper wall 14 and surrounds an annular combustion bowl 26 that depends therefrom, and thus, the combustion bowl 26 is recessed below the uppermost first portion 18 of the upper combustion surface 16. The combustion bowl 26 is shown as being contoured to provide an upper apex, also referred to as center peak 28, which may lie coaxially along a central axis 30 of the piston 10 or may be radially offset relative to the piston central axis 30. The top section 13 further forms a ring belt region 32 that depends from the upper combustion surface 16 to provide one or more ring grooves 34 for receipt of one or more corresponding piston rings (not shown).

The piston body 12 further includes a bottom section 36. The bottom section 36 includes a pair of pin bosses 38 depending from the upper section 13 and generally from the upper wall 14. The pin bosses 38 each have a pin bore 40, preferably bushless given the steel construction, wherein the pin bores 40 are laterally spaced from one another coaxially along a pin bore axis 42 that extends generally transversely to the central longitudinal axis 30. The pin bosses 38 have generally flat, radially outermost surfaces, referred to as outer faces 43, that are spaced from one another along the pin bore axis 40 a distance PB, shown as being generally parallel with one another, wherein the PB dimension is minimized, thereby maximizing an exposed area of a recessed, generally cup-shaped region, referred to hereafter as pockets 50, extending radially outwardly of the pin bosses 38 generally along the pin bore axis 40 and upwardly along the undercrown 24. The pockets 50 form a portion of the undercrown 24, and extend radially outwardly beyond the undercrown 24 along an underside surface of the annular first portion 18 of the upper combustion surface 16 and depend from the upper wall 14 along an inner surface of the ring belt region 32. As such, with the 2-dimensional and 3-dimensional surface area of the pockets 50 being maximized, at least in part due to the minimized distance PB, the cooling caused by oil splashing or being sprayed upwardly from the crankcase against the exposed surface of the pockets 50 is enhanced, thereby lending to further cooling of the upper combustion surface 16, the undercrown 24, as well as a portion of the ring belt region 34.

The pin bores 40 each have a concave uppermost load bearing surface, referred to hereafter as uppermost surface 44, extending planar or substantially planar with a lowermost surface 46 of the ring belt region 32. As such, the compression height CH is minimized (the compressing height is the dimension extending from the pin bore axis 42 to the upper combustion surface 16). The pin bosses 38 are joined via outer panels, also referred to as struts 46, to diametrically opposite skirt portions, also referred to as skirt panels 48 of the bottom section 36. The skirt panels 48 and struts 46 bound open channels 49 extending from a lowermost or bottom surface 51 of the struts 46 and skirt panels 48 to the undercrown surface 24. The open channels 49 provide direct access to oil splashing or being sprayed from within the crankcase directly onto the undercrown surface 24, thereby allowing the entire undercrown surface 24 to be splashed directly by oil from within the crankcase, while also allowing the oil to freely splash about the wrist pin (not shown), and further, significantly reduce the weight of the piston 10. Accordingly, although not having a typical closed or partially closed cooling gallery, the generally open configuration of the galleryless piston 10 allows optimal cooling of the undercrown surface 24 and lubrication to the wrist pin joint within the pin bores 40, while at the same time reducing oil residence time (the time in which a volume of oil remains on the a surface) on the surfaces near the combustion bowl. This can reduce unwanted build-up of coked oil, such as can occur in pistons having a closed or substantially closed cooling gallery. As such, the piston 10 remains "clean" over extended use, thereby allowing it to remain substantially free of debris build-up.

Figure 19A:
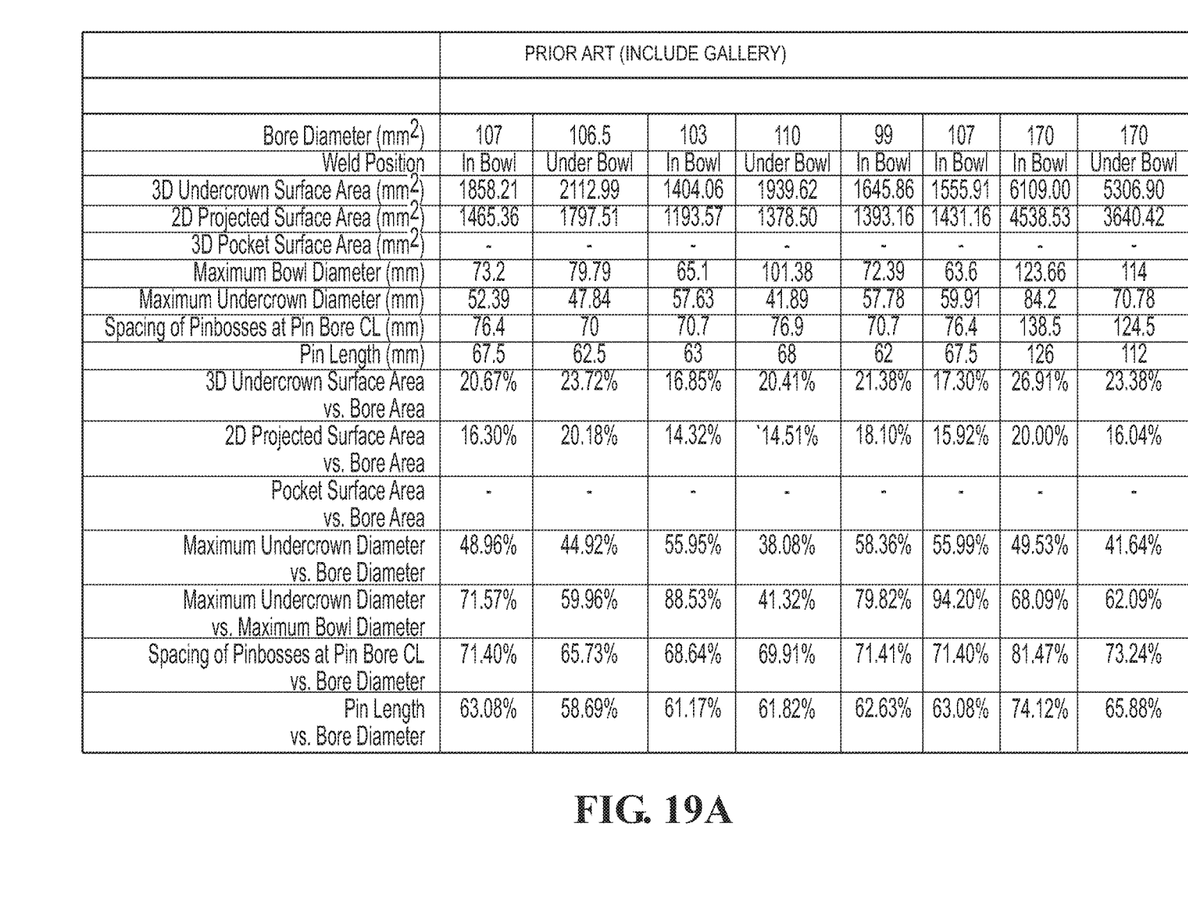
FIGS. 19A-19B are charts of empirical data of prior art pistons including a cooling gallery.
Figure 19B:
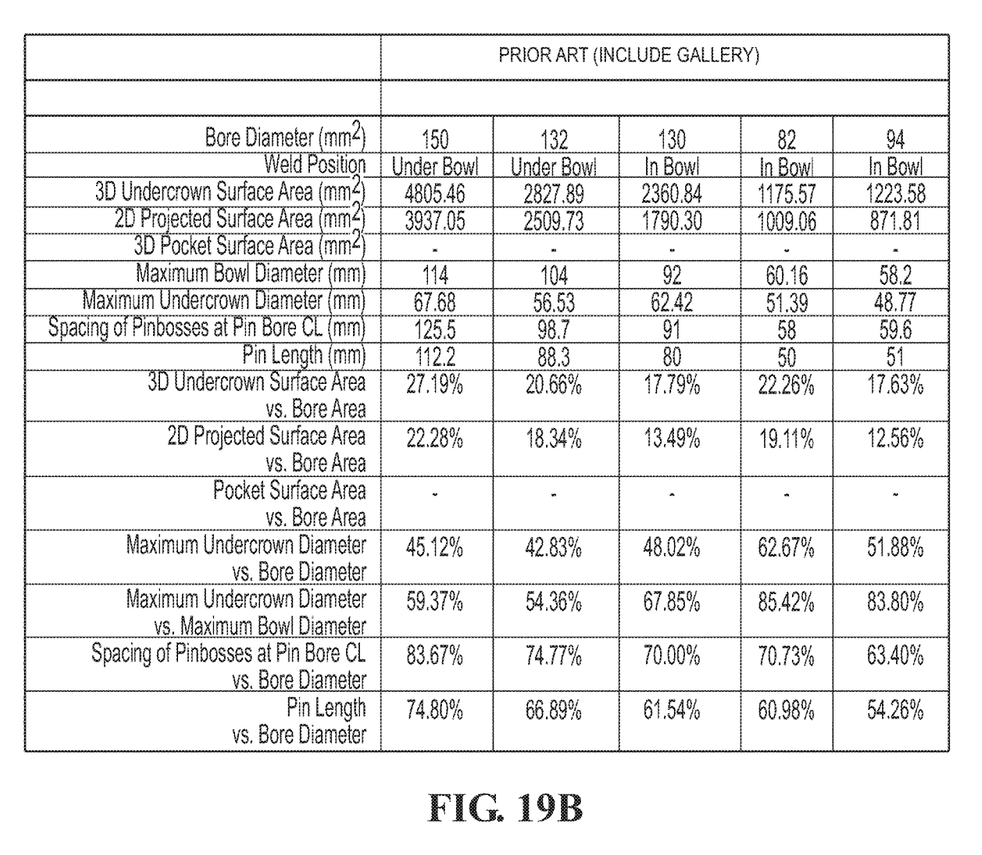
Figure 19C:
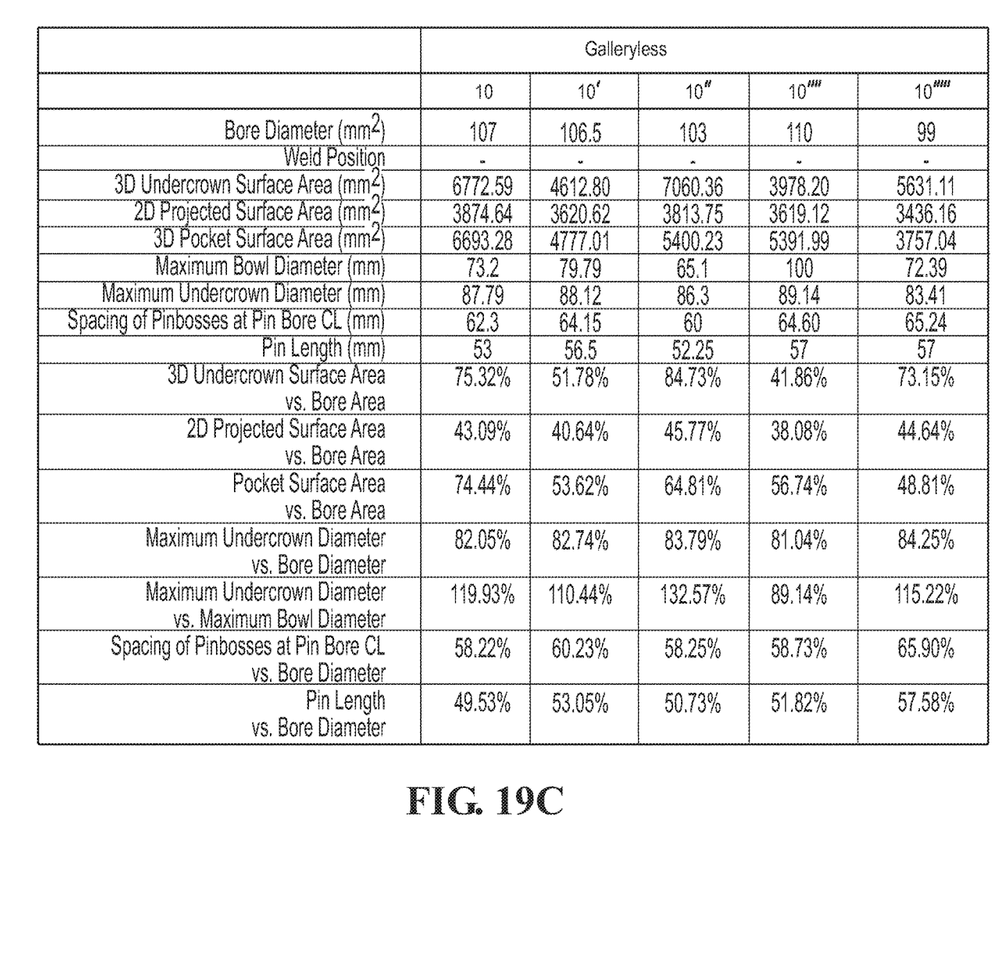
FIG. 19C is a chart of empirical data of the galleryless pistons of FIGS. 1-12 and 15-18.

Owing to the optimal cooling of the undercrown surface 24 is the percentage of the undercrown surface 24 directly underlying the upper combustion surface 16 that is directly exposed to the splashing and sprayed oil from the crankcase. The empirical data charted in FIG. 19C of the pistons 10, 10', 10", 10''', 10'''', and further discussion below, along with the charted data in FIGS. 19A and 19B of the "prior art" pistons having a closed or partially closed cooling gallery, demonstrates the enhanced direct exposure of the undercrown surface 24, 24', 24", 24''', 24'''' to oil splashing directly from the crankcase, with some of the data being discussed in more detail hereafter. It should be recognized that the pistons 10', 10", 10''', 10'''', 10''''' shown in respective FIGS. 5-8, 9-12, 13-14, 15-16, and 17-18 include similar features as described above for the piston 10, and thus, further details with respect thereto is believed unnecessary, with the understanding that slightly modified configurations of the respective combustion bowl wall portions 21', 21", 21''', 21'''', 21''''' provide a substantial majority of the difference in the data associated with the exposed undercrown surface 24', 24", 24''', 24'''', 24''''' of the pistons 10', 10", 10''', 10'''', 10''''' for both a total surface area (3-dimensional area following the contour of the surface) and a projected surface area (2-dimensional area, planar, as seen in plan view). The undercrown surface 24, 24', 24", 24''', 24'''', 24''''' of the pistons 10, 10', 10", 10''', 10'''', 10''''' has a total exposed surface area, defined as the 3-dimensional area following the contour of the undercrown surface 24, 24', 24", 24''', 24'''', 24''''' that is greater than 40 percent of, and between about 40-90 percent of the area of the cylinder bore, and thus, between about 40-90 percent of the 2-dimensional area defined by the maximum outer diameter OD of the piston 10, 10', 10", 10''', 10'''', 10''''' (FIGS. 3, 5, 9, 13, 15, 17). By way of example and without limitation, the piston 10 of FIGS. 1-4 has a total undercrown surface area of about 6773 mm$^2$ in a 107 mm cylinder bore, and can have a total surface area between about 75-80 percent of the cylinder bore area; the piston 10' of FIGS. 5-8 has a total undercrown surface area of about 4613 mm$^2$ in a 106.5 mm cylinder bore, and can have a total surface area between about 50-55 percent of the cylinder bore area; the piston 10" of FIGS. 9-12 has a total undercrown surface area of about 7060 mm$^2$ in a 103 mm cylinder bore, and can have a total surface area between about 80-85 percent of the cylinder bore area; the piston 10'''' of FIGS. 15-16 has a total undercrown surface area of about 3978 mm$^2$ in a 110 mm cylinder bore, and can have a total surface area between about 40-45 percent of the cylinder bore area; and the piston 10''''' of FIGS. 17-18 has a total undercrown surface area of about 5630 mm$^2$ in a 99 mm cylinder bore, and can have a total surface area between about 70-75 percent of the cylinder bore area.

Further yet, the undercrown surface 24, 24', 24", 24''', 24'''' has a projected surface area, defined as the 2-dimensional area seen looking generally along the central longitudinal axis 30, 30', 30", 30''', 30'''' from the bottom of the piston 10, 10', 10", 10''', 10'''' between about 35-60 percent of the area of the cylinder bore, and thus, between about 35-60 percent of the area defined by the maximum outer diameter OD of the piston 10, 10', 10", 10''', 10''''. By way of example and without limitation, the piston 10 of FIGS. 1-4 has a projected undercrown surface area of about 3875 mm$^2$ in a 107 mm cylinder bore, and can have a projected undercrown surface area between about 40-45 percent of the cylinder bore area; the piston 10' of FIGS. 5-8 has a projected undercrown surface area of about 3621 mm$^2$ in a 107 mm cylinder bore, and can have a projected undercrown surface area between about 40-45 percent of the cylinder bore area; the piston 10" of FIGS. 9-12 has a projected undercrown surface area of about 3814 mm$^2$ in a 103 mm cylinder bore, and can have a projected undercrown surface area between about 45-60 percent of the cylinder bore area; the piston 10'''' of FIGS. 15-16 has a projected undercrown surface area of about 3619 mm$^2$ in a 110 mm cylinder bore, and can have a projected undercrown surface area between about 35-40 percent of the cylinder bore area; and the piston 10''''' of FIGS. 17-18 has a projected undercrown surface area of about 3436 mm$^2$ in a 99 mm cylinder bore, and can have a projected undercrown surface area between about 40-45 percent of the cylinder bore area.

Further yet, the exposed area of the undercrown surface 24, 24', 24", 24''', 24'''' constructed in accordance with the invention has a diameter D between about 75-90 percent of the diameter of the cylinder bore, and thus, between about 75-90 percent of the maximum outer diameter OD of the piston 10, 10', 10", 10''', 10''''. By way of example and without limitation, the exposed undercrown surface 24 of the piston 10 of FIGS. 1-4 has a diameter D (FIG. 2) of about 88 mm in a 107 mm cylinder bore; the exposed undercrown surface 24' of the piston 10' of FIGS. 5-8 has a diameter D (FIG. 6) of about 88 mm in a 107 mm cylinder bore; the exposed undercrown surface 24" of the piston 10" of FIGS. 9-12 has a diameter D (FIG. 9) of about 86 mm in a 103 mm cylinder bore; the exposed undercrown surface 24''' of the piston 10''' of FIGS. 15-16 has a diameter D of about 89 mm in a 110 mm cylinder bore; and the exposed undercrown surface 24'''' of the piston 10'''' of FIGS. 17-18 has a diameter D of about 83 mm in a 99 mm cylinder bore.

Further yet, the exposed area of the undercrown surface 24, 24', 24", 24''', 24'''' constructed in accordance with the invention has a diameter D between about 85-140 percent of the diameter CD of the combustion bowl 26, 26', 26", 26''', 26'''', which is in contrast to a maximum of 100 percent for a piston having a closed or substantially closed cooling gallery. By way of example and without limitation, the exposed undercrown surface 24 of the piston 10 of FIGS. 1-4 has a diameter D of about 88 mm with a combustion bowl diameter of about 73 mm; the exposed undercrown surface 24' of the piston 10' of FIGS. 5-8 has a diameter D of about 88 mm with a combustion bowl diameter of about 80 mm; the exposed undercrown surface 24" of the piston 10" of FIGS. 9-12 has a diameter D of about 86 mm with a combustion bowl diameter of about 65 mm; the exposed undercrown surface 24''' of the piston 10''' of FIGS. 15-16 has a diameter D of about 89 mm with a combustion bowl diameter of about 100 mm; and the exposed undercrown surface 24'''' of the piston 10'''' of FIGS. 17-18 has a diameter D of about 83 mm with a combustion bowl diameter of about 72 mm. These percentages of relative surface areas and relative diameters of the exposed undercrown surface 24, 24', 24", 24''', 24'''' are far in excess of known pistons, and in some cases, are upwards to 3 times greater or more. As such, the upper combustion surface 16, 16', 16", 16''', 16'''' can be cooled directly via oil splashing upwardly from the crankcase, which can be coupled with the assistance from oil jets, if desired.

In addition, the pistons 10, 10', 10", 10''', 10'''' have respective pockets 50, 50', 50", 50''', 50'''', as discussed above. The pocket 50 has a surface area of about 6693 mm², which is about 74 percent of the area of the 107 mm cylinder bore area, and thus, can be configured between about 70-80 percent of the 2-dimensional area defined by the maximum outer diameter OD of the upper combustion surface 16. The pocket 50' has a surface area of about 4777 mm², which is about 80 percent of the area of the 106.5 mm cylinder bore area, and thus, can be configured between about 75-85 percent of the 2-dimensional area defined by the maximum outer diameter OD of the upper combustion surface 16'. The pocket 50" has a surface area of about 5400 mm², which is about 65 percent of the area of the 103 mm cylinder bore area, and thus, can be configured between about 60-70 percent of the 2-dimensional area defined by the maximum outer diameter OD of the upper combustion surface 16". The pocket 50''' has a surface area of about 5392 mm², which is about 57 percent of the area of the 110 mm cylinder bore area, and thus, can be configured between about 50-60 percent of the 2-dimensional area defined by the maximum outer diameter OD of the upper combustion surface 16'''. The pocket 50'''' has a surface area of about 3757 mm², which is about 49 percent of the area of the 99 mm cylinder bore area, and thus, can be configured between about 45-55 percent of the 2-dimensional area defined by the maximum outer diameter OD of the upper combustion surface 16''''. As such, the surface areas of the pockets 50, 50', 50", 50''', 50'''' are able to contribute significantly to the cooling of the regions of the regions of the upper combustion surfaces 16, 16', 16", 16''', 16'''' located directly above the pockets 50, 50', 50", 50''', 50''''.

In accordance with another aspect of the invention, the undercrown surface 24''' of the piston 10''' extending between the opposite skirt portions and between pin bosses, transversely to the central pin bore axis, is concave in form. As such, oil is channeled during reciprocation of the piston 10''' from one side of the piston to the opposite side of the piston, thereby acting to further enhance cooling of the piston.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A galleryless piston for an internal combustion engine, comprising: a monolithic galleryless piston body extending along a central longitudinal axis along which said piston reciprocates in a cylinder bore of an internal combustion engine, said piston body having an upper wall forming an upper combustion surface with an annular ring belt region depending from said upper combustion surface for receipt of at least one piston ring; a pair of skirt portions depending from said ring belt region to facilitate guiding the piston within a cylinder bore and having a pair of pin bosses providing a pair of laterally spaced pin bores aligned along a pin bore axis for receipt of a wrist pin; said upper combustion surface having first and second portions, said first portion extending annularly along an outer periphery of said upper wall and said second portion forming a combustion bowl depending radially inwardly from said first portion; said upper wall having an undercrown surface formed on an underside of said combustion bowl directly opposite said second portion of said upper combustion surface, said undercrown surface having a complete openly exposed projected total 3-dimensional surface area that is greater than 40 percent of an area defined by a maximum outer diameter of said piston body.

2. The galleryless piston of claim 1, wherein said undercrown surface has a total 3-dimensional surface area greater than 50 percent of said area of said piston body.

3. The galleryless piston of claim 1, wherein said undercrown surface has a total 3-dimensional surface area greater than 60 percent of said area of said piston body.

4. The galleryless piston of claim 1, wherein said undercrown surface has a total 3-dimensional surface area greater than 70 percent of said area of said piston body.

5. The galleryless piston of claim 1, wherein said undercrown surface has a diameter between about 75-90 percent of said maximum outer diameter of said piston body.

6. The galleryless piston of claim 1, wherein said combustion bowl has a maximum combustion bowl diameter and said undercrown surface has a diameter that is at least 85 percent of said maximum combustion bowl diameter.

7. The galleryless piston of claim 6, wherein said undercrown surface has a diameter that is between 100-140 percent of said maximum combustion bowl diameter.

8. The galleryless piston of claim 1, wherein a pair of pockets extend radially outwardly from said pin bosses along said pin bore axis to said ring belt region, said pockets defining at least a portion of said undercrown surface, a portion of an underside of said first portion and a portion of an inner surface of said annular ring belt region, said pockets having a total 3-dimensional surface area between about 45-85 percent of said area of said piston body.

9. The galleryless piston of claim 8, wherein said pockets have a total 3-dimensional surface area greater than 60 percent of said area of said piston body.

10. The galleryless piston of claim 9, wherein said pockets have a total 3-dimensional surface area greater than 70 percent of said area of said piston body.

11. The galleryless piston of claim 1, wherein said pin bosses have radially outermost surfaces spaced from one another along said pin bore axis at a first distance that is less than 60 percent of said maximum outer diameter of said piston body.

12. A galleryless piston for an internal combustion engine, comprising: a monolithic galleryless piston body extending along a central longitudinal axis along which said piston reciprocates in a cylinder bore of an internal combustion engine, said piston body having an upper wall forming an upper combustion surface with an annular ring belt region depending from said upper combustion surface for receipt of at least one piston ring; a pair of skirt portions depending from said ring belt region to facilitate guiding the piston within a cylinder bore and having a pair of pin bosses providing a pair of laterally spaced pin bores aligned along a pin bore axis for receipt of a wrist pin; said upper combustion surface having first and second portions, said first portion extending annularly along an outer periphery of said upper wall and said second portion forming a combustion bowl depending radially inwardly from said first portion; said upper wall having an undercrown surface formed on an underside of said combustion bowl directly opposite said second portion of said upper combustion surface, wherein said combustion bowl has a maximum combustion bowl diameter and said undercrown surface having a complete openly exposed projected surface area that has a diameter that is at least 85 percent of said maximum combustion bowl diameter.

13. The galleryless piston of claim 12, wherein said undercrown surface has a diameter that is between 100-140 percent of said maximum combustion bowl diameter.

14. The galleryless piston of claim 12, wherein a pair of pockets extend radially outwardly from said pin bosses along said pin bore axis to said ring belt region, said pockets defining at least a portion of said undercrown surface, a portion of an underside of said first portion and a portion of an inner surface of said annular ring belt region, said pockets having a total 3-dimensional surface area between about 45-85 percent of said area of said piston body.

15. The galleryless piston of claim 14, wherein said pockets have a total 3-dimensional surface area greater than 60 percent of said area of said piston body.

16. The galleryless piston of claim 15, wherein said pockets have a total 3-dimensional surface area greater than 70 percent of said area of said piston body.

17. The galleryless piston of claim 12, wherein said piston body has a maximum outer diameter and said pin bosses have radially outermost surfaces spaced from one another along said pin bore axis at a first distance that is less than 60 percent of said maximum outer diameter of said piston body.

18. A galleryless piston for an internal combustion engine, comprising: a monolithic galleryless piston body extending along a central longitudinal axis along which said piston reciprocates in a cylinder bore of an internal combustion engine, said piston body having an upper wall forming an upper combustion surface with an annular ring belt region depending from said upper combustion surface for receipt of at least one piston ring; a pair of skirt portions depending from said ring belt region to facilitate guiding the piston within a cylinder bore and having a pair of pin bosses providing a pair of laterally spaced pin bores aligned along a pin bore axis for receipt of a wrist pin; said upper combustion surface having first and second portions, said first portion extending annularly along an outer periphery of said upper wall and said second portion forming a combustion bowl depending radially inwardly from said first portion; said upper wall having an undercrown surface formed on an underside of said combustion bowl directly opposite said second portion of said upper combustion surface, wherein a pair of pockets extend radially outwardly from said pin bosses along said pin bore axis to said ring belt region, said pockets defining at least a portion of said undercrown surface, a portion of an underside of said first portion and a portion of an inner surface of said annular ring belt region, said pockets having a complete openly exposed projected total 3-dimensional surface area between 45-85 percent of an area defined by a maximum outer diameter of said piston body.

19. The galleryless piston of claim 18, wherein said pockets have a total 3-dimensional surface area greater than 60 percent of said area of said piston body.

20. The galleryless piston of claim 19, wherein said pockets have a total 3-dimensional surface area greater than 70 percent of said area of said piston body.

21. The galleryless piston of claim 18, wherein said undercrown surface has a total 3-dimensional surface area greater than 50 percent of said area of said piston body.

22. The galleryless piston of claim 18, wherein said undercrown surface has a total 3-dimensional surface area greater than 60 percent of said area of said piston body.

23. The galleryless piston of claim 18, wherein said undercrown surface has a total 3-dimensional surface area greater than 70 percent of said area of said piston body.

24. The galleryless piston of claim 18, wherein said undercrown surface has a diameter between about 75-90 percent of said maximum outer diameter of said piston body.

25. The galleryless piston of claim 18, wherein said combustion bowl has a maximum combustion bowl diameter and said undercrown surface has a diameter that is at least 85 percent of said maximum combustion bowl diameter.

26. The galleryless piston of claim 25, wherein said undercrown surface has a diameter that is between 100-140 percent of said maximum combustion bowl diameter.

* * * * *